United States Patent [19]

Solow

[11] Patent Number: 4,658,613
[45] Date of Patent: Apr. 21, 1987

[54] AUTOMOBILE ANTI-THEFT DEVICE

[75] Inventor: Joseph E. Solow, Plainview, N.Y.

[73] Assignee: Wolo Manufacturing Corporation, Deer Park, N.Y.

[21] Appl. No.: 802,870

[22] Filed: Nov. 27, 1985

[51] Int. Cl.$^4$ .............................................. E05B 17/14
[52] U.S. Cl. ......................................... 70/427; 70/247
[58] Field of Search ....................... 70/15, 18, 19, 192, 70/254, 237, 245, 247-249, 424, 427, 428

[56] References Cited

U.S. PATENT DOCUMENTS

| | | | |
|---|---|---|---|
| 640,297 | 1/1900 | Masten | 70/15 |
| 662,334 | 11/1900 | Appleby | 70/15 |
| 1,283,493 | 11/1918 | Garner | 70/237 |
| 3,434,315 | 3/1969 | Di Benedetto | 70/247 |
| 3,508,424 | 4/1970 | Eisenman | 70/247 |
| 3,810,369 | 5/1974 | Giovanniello | 70/247 |
| 3,990,280 | 11/1976 | Jahn | 70/247 |
| 4,008,589 | 2/1977 | Harrell | 70/424 |
| 4,103,524 | 8/1978 | Mitchell et al. | 70/237 |
| 4,282,730 | 8/1981 | Lipshutz | 70/18 |
| 4,304,111 | 12/1981 | Nolin | 70/428 |
| 4,317,346 | 3/1982 | Gutman | 70/424 |
| 4,404,822 | 9/1983 | Green | 70/18 |
| 4,490,997 | 1/1985 | Hughes et al. | 70/18 |
| 4,494,391 | 1/1985 | Solow . | |
| 4,505,140 | 3/1985 | Solow . | |

Primary Examiner—Thomas J. Holko
Assistant Examiner—Suzanne L. Dino
Attorney, Agent, or Firm—Brumbaugh, Graves, Donohue & Raymond

[57] ABSTRACT

An automobile anti-theft device includes a cover that fits over a steering column-mounted ignition lock, and a flexible element that wraps around the steering column and secures the cover thereto. A gear shift lock bar is attached to a sidewall of the cover, and extends laterally from the cover, wraps around a column-mounted gear shift lever, and includes a free end that extends back under the tension bearing element to be secured thereby. The device protects the ignition lock from tampering and in addition prevents the gear shift lever from being moved into gear in the event that the ignition lock is bypassed.

4 Claims, 5 Drawing Figures

AUTOMOBILE ANTI-THEFT DEVICE

FIELD OF THE INVENTION

The present invention is an automobile anti-theft device for steering columns containing an ignition lock and a column-mounted gear shift lever.

BACKGROUND OF THE INVENTION

Most present day automobiles contain an ignition lock mounted in the steering column below the steering wheel. The lock functions both as an ignition cut-off and to prevent turning of the steering wheel. In practice, however, a thief can readily defeat an ignition lock by using a master key or a device which pulls the lock, such as a dent puller, to expose the ignition wires.

Wolo Manufacturing Corporation, the assignee of this application, presently sells a device which protects the ignition lock from tampering. In this device, which is shown and described more fully in my prior U.S. Pat. No. 4,494,391, a steering lock protective cover fits over the ignition lock flush against the steering column, and is held firmly against the steering column by a flexible chain element secured at opposite ends of the housing. This device is easy to use and has proven to be extremely effective.

While this device protects the ignition lock, determined automobile thieves have found that it is sometimes possible to by-pass the ignition lock altogether, and to gain access to the ignition wires from the side of the steering column opposite the lock.

SUMMARY OF THE INVENTION

The present invention is an improved anti-theft device for automobiles. When in place, the device protects a steering column ignition lock from tampering. In addition, the device prevents the operation of the gear shift lever so that, even if the lock is by-passed, the car cannot be driven.

In particular, an anti-theft device according to the invention includes a cover having a hollow interior space open on one side. The open side is defined by laterally separated sidewalls, having arcuate edge surfaces spacing opposite ends of the cover, thereby being adapted to fit over a portion of the steering column containing an ignition lock. A tension bearing element is attached to one end of the cover, wraps around the steering column, and is releasably attached to the other end of the cover. In addition, a gear shift lock bar is attached to one sidewall and projects laterally from the cover a distance sufficient to interfere with the movement of the gear shift lever out of the "park" position.

Preferably, the gear shift lock bar includes a U-shaped portion sized to fit around the gear shift lever, and a free end that extends back toward the cover and under the tension bearing element such that the element holds the free end of the bar securely. The tension bearing element is preferably flexible, for example the flexible chain element disclosed in my prior U.S. Pat. No. 4,494,391.

In use, the cover fits over the ignition lock and the arcuate portions rest flush against the steering column, with the gear shift lock bar extending around the gear shift lever and back under the flexible tension bearing element. The tension bearing element wraps over the free end of the security bar, around the steering column, and is locked securely in the other end of the column to hold the anti-theft device firmly against the steering column. Accordingly, even a thief able to hot-wire the ignition would be unable to move the gear shift lever out of "park".

As disclosed in U.S. Pat. No. 4,494,391, the chain element in the preferred embodiment of the device is held, at its free end, within the cover by both a locking mechanism and by projecting portions on the cover itself. Accordingly, it is extremely difficult to pry loose or remove the chain. The chain overlies the gear shift lock bar and thus the bar is tamper-resistant. Also, because the cover is not rotatable around the outside of the steering column (due to interference of the projecting lock boss), it is not possible to put the car in gear until the anti-theft device is released.

For a better understanding of the invention, reference is made to the following detailed description of a preferred embodiment, taken in conjunction with the drawings accompanying the application.

DETAILED DESCRIPTION OF A PREFERRED EMBODIMENT

Figure 1:
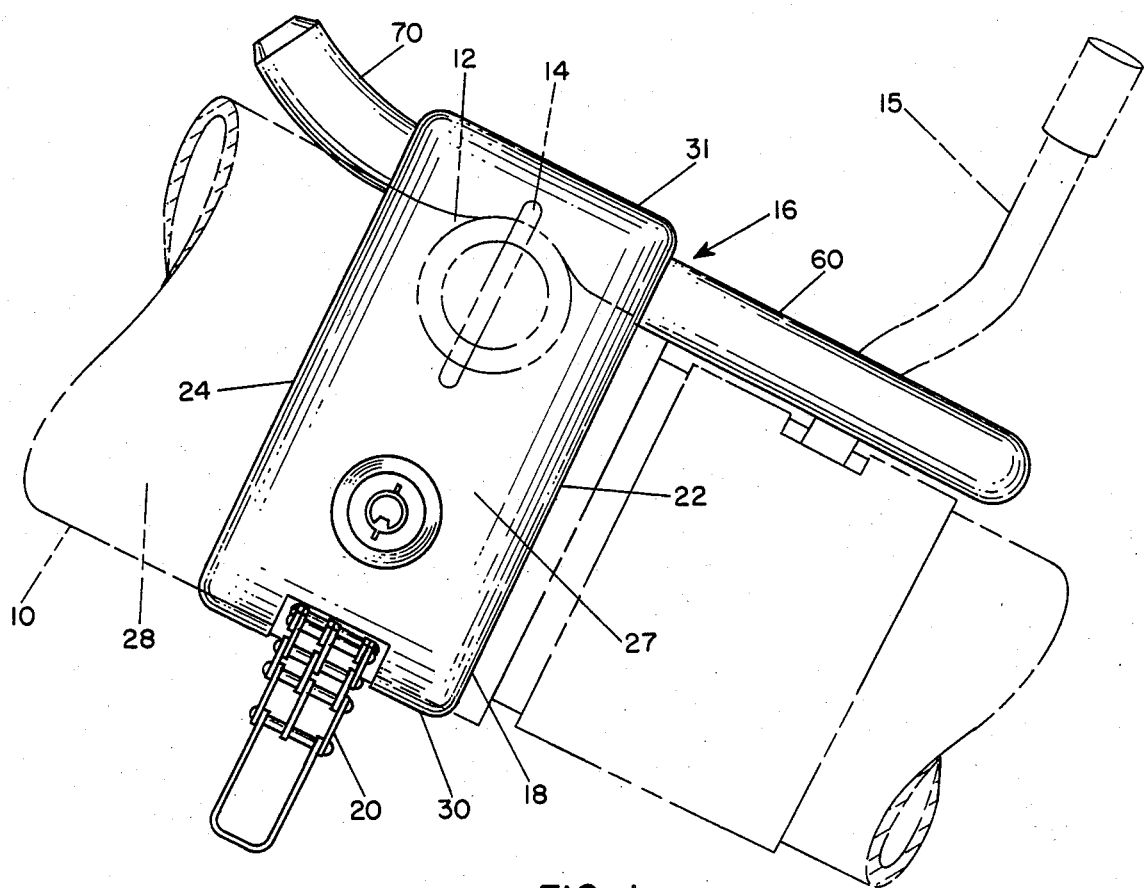
FIG. 1 is a front view of an anti-theft device in accordance with the invention, shown mounted on a portion of an automobile steering column, depicted in phantom.

For purposes of illustrating the invention, a typical automobile steering column 10 is shown. The steering column 10 includes a boss 12 in which is mounted an ignition lock 14. In typical automobile applications, the ignition lock 14 also locks the steering column. A gear shift lever 15 is also mounted in the steering column 10, and is pivotable in a plane perpendicular to the axis of the steering column 10 for moving between the "park" position, shown in FIGS. 1 and 2, and the various drive gears.

The anti-theft device 16 in accordance with the invention includes three pieces: a hollow cover 18, a flexible tension bearing element 20, and a gear shift lock bar 60.

The cover 18 is formed with one side open, and a pair of opposed sidewalls 22, 24 that include arcuate edges 26 adapted to wrap around a portion of the outer cylindrical surface 28 of the steering column. An outer wall 27 is arranged perpendicular to the sidewalls 22, 24 at the edges away from edges 26. The cover 18 also includes opposed top 31 and bottom 30 walls arranged perpendicular to the outer wall 27 and to the side walls 22, 24.

Figure 2:
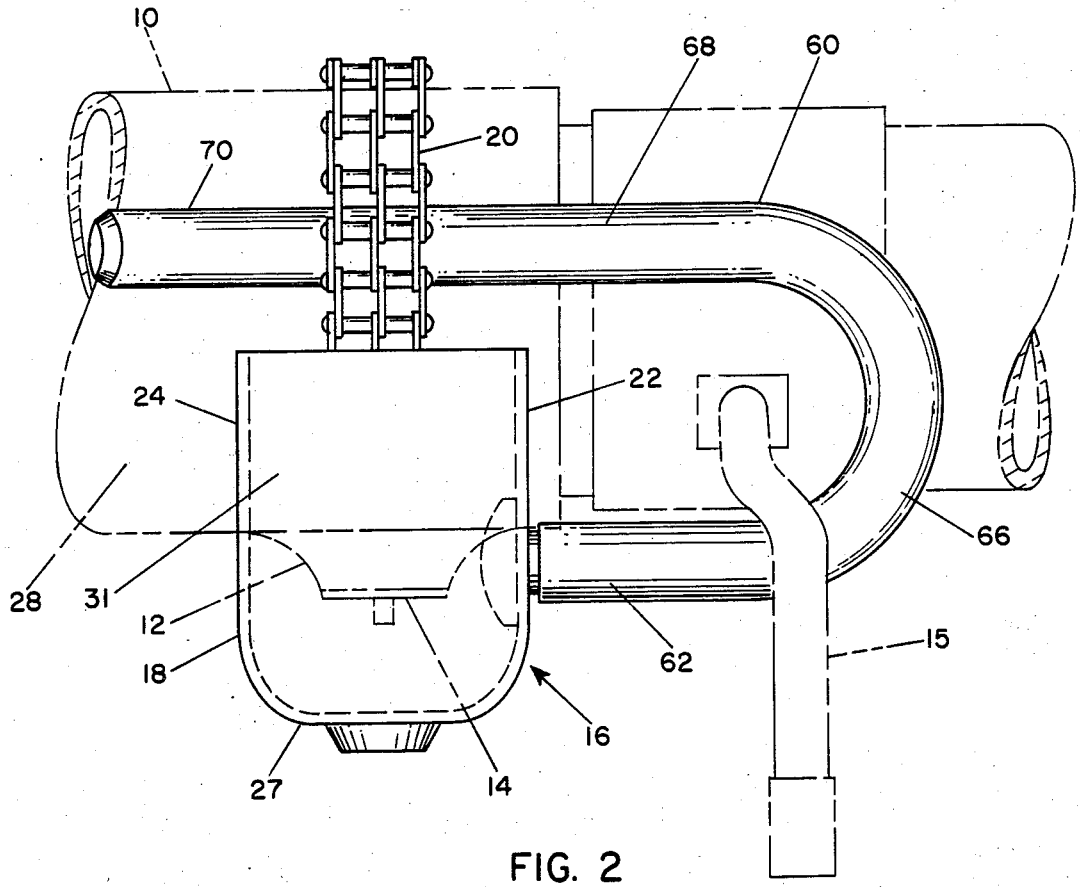
FIG. 2 is a top view of the arrangement shown in FIG. 1.
Figure 3:
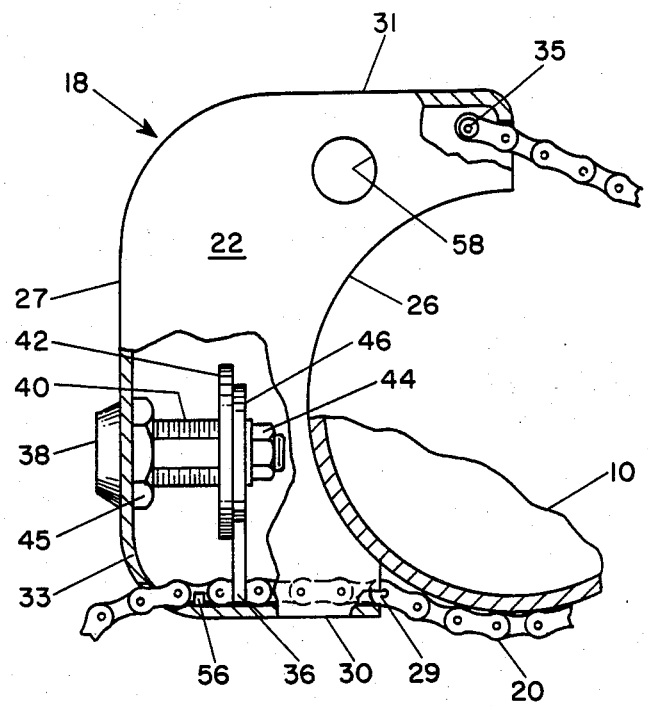
FIG. 3 is a side view, partially in section, of the cover portion of a device in accordance with the invention partially assembled.

The flexible tension bearing element 20 is preferably a link chain such as a double strand link chain. The chain 20 is fixed at one end by pivot pin 35 (FIG. 3) to the cover 18 at the upper wall 31. The arcuate sections 26 are formed to space the lower wall 30 from the steering column 10 to define an opening 29 such that the chain 20 may be inserted into the housing 18 between the lower wall 30 and the steering column 10. As shown in FIGS. 1-3, the chain 20 is wrapped around the steering column 10, inserted into the housing portion 18, and locked therein to affix the ignition lock cover 16 to the steering column.

Referring to FIG. 3, the chain 20 is directed through the interior of the housing cover 18 and extends out through a front opening, transverse slot 33, in the cover.

When the chain is inserted through the cover and pulled through the transverse slot 33, the chain 20 may thereafter be pulled taut out of the housing 18 through the slot 33 so that the housing 18 is held securely against a steering column 10.

The chain 20 is selectively engaged by a pair of projections 36 on a plate 46 moveable up and down by a rotating shaft, disposed in barrel 40, of a lock 38. A cam 42 is fixed on the rotatable shaft and the assembly is held in place by a nut 44. The lock 38 is secured against the housing by nut 45. When the lock 38 is rotated, an eccentric projection on element 42 engages a cooperating portion on plate 46 so as to move the projections 36 up and down, into or out of engagement between cross-links of the chain 20. The foregoing represents a simplified description of a preferred locking arrangement for the tension bearing element 20 shown in U.S. Pat. No. 4,494,391. Further details of the locking configuration are well-known from my prior device, which is marketed by Wolo Manufacturing Corporation, and described in the aforesaid patent, the pertinent portions of which are incorporated by reference. Preferably, the projections 36 include a portion to hold the chain down against the surface of the plate 30, and back stops 56 formed in the bottom plate 30 are provided which cooperate with the projections 36 to lock the chain in place.

Figure 4:
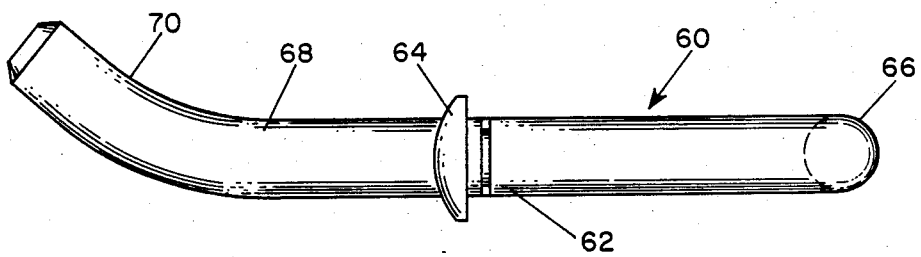
FIG. 4 is a front view of a gear shift lock bar used in the device in accordance with the invention.
Figure 5:
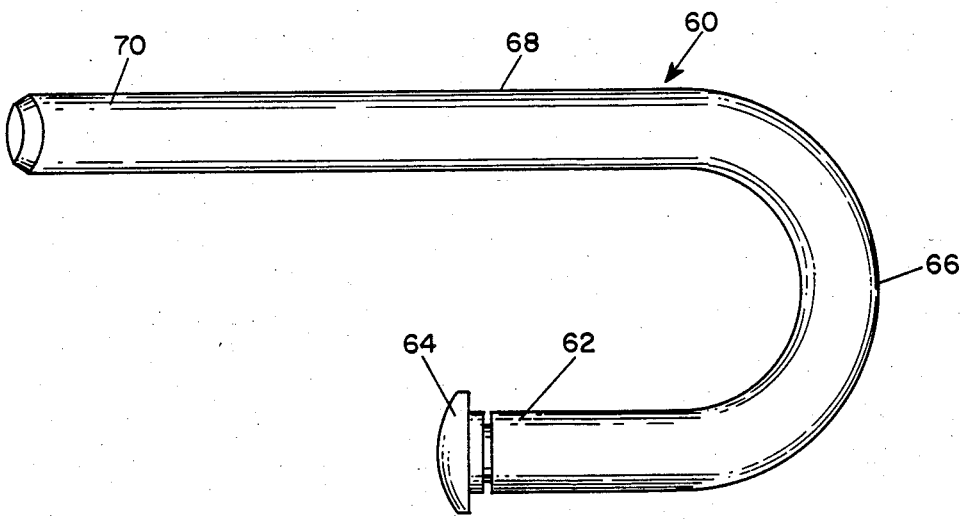
FIG. 5 is a top view of the gear shift lock bar shown in FIG. 4.

As shown in FIG. 3, the sidewall 22 of the cover 18 has a hole 58 formed therein, the purpose of which is to receive a gear shift lock bar 60, an exemplary embodiment being shown in FIGS. 4 and 5. The gear shift lock bar 60 includes an end 62 which is attached to the sidewall 22.

As shown in FIGS. 2, 4, and 5, by way of example, the bar 60 includes an enlarged end cap 64, which may be screwed, welded, staked, or otherwise attached to end 62, after the end 62 is located against the hole 58. Preferably, the bar 60 is pivotally secured on the sidewall 22, i.e. pivotable in a plane perpendicular to the steering column axis. The attachment means is by way of illustration, and other pivotable or fixed attachment means may be employed. For example, the end 62 may be pivotable in other planes to facilitate mounting about the gear shift lever 15. When the device 16 is finally secured to the sterring column 10, the bar 60 will nevertheless be held securely in place by chain 20 overlying free end 68, 70.

Referring again to FIGS. 4 and 5, the gear shift lock bar 60 includes a U-shaped portion 66, and a free end 68 that extends parallel to first portion 62 and terminates in an upturned end portion 70.

Referring to FIGS. 1 and 2, as attached to the cover 18, the gear shift lock bar 60 extends laterally toward the gear shift lever 15, and thereafter U-shaped portion 66 wraps around the gear shift lever 15. Portion 68 projects laterally back toward the cover 18, and extends under the chain 20. Upturned portion 70 is disposed on the opposite side of the chain 20 when the device is mounted.

As is apparent in FIGS. 1 and 2, the device attaches quickly and easily to the steering column of an automobile such that the cover plate protects the steering column ignition lock, and at the same time the security bar extends around the gear shift lever. Security is enhanced by the fact that the bar includes the free end portion 68 that extends under the flexible chain element, which can be wrapped tightly around the bar 60 to further secure it in place. Finally, the upturned end portion 70 renders it more difficult to free the bar. As noted before, the cover fits over a projecting boss 12 housing the ignition lock. Accordingly, when the cover is in place, it is not possible to rotate the cover to any substantial degree, and it is therefore not possible to move the gear shift lever out of the "park" position into gear.

The foregoing represents a preferred embodiment of the invention. Variations and modifications of the embodiment shown and described will be apparent to persons skilled in the art, without departing from the inventive concepts disclosed herein. For example, on steering columns that do not include a gear shift lever, it may be possible to employ a security bar of a different configuration, adapted to interfere with the operation of another element, such as the steering wheel. All such modifications and variations, to the extent they fall within the inventive principles disclosed herein, form part of the invention as defined in the following claims.

I claim:

1. An automobile anti-theft device for a steering column with an ignition lock and a column-mounted gear shift lever moveable between "park" and selected gears, comprising:

a cover having a hollow interior space and being open on one side, the open side defined by laterally separated sidewalls having arcuate edge surfaces spacing opposite ends of said cover, thereby being adapted to fit over a portion of a steering column containing an ignition lock;

a tension bearing element;

means for attaching one end of said element to one end of said cover to permit the remaining portion to wrap around a steering column;

means for releasably attaching said element to the other end of said cover; and a gear shift lock bar having one end attached to one sidewall of said cover and projecting laterally from said cover a distance sufficient, when said device is mounted on a steering column, to interfere with the movement of the gear shift lever from "park", wherein said gear shift lock bar has a portion sized to fit around a column mounted gear shift lever, wherein said portion is a U-shaped portion, and wherein said gear shift lock bar further includes a free end that extends, in the lateral direction, back toward the cover and under the tension bearing element.

2. An automobile anti-theft device as defined in claim 1, wherein said free end includes a distal upturned portion, located laterally on the side of the tension bearing element opposite of the U-shaped portion.

3. An automobile anti-theft device as defined in claim 2, wherein said tension bearing element is flexible.

4. An automobile anti-theft device as claimed in claim 1, wherein the one end of said gear shift lock bar is pivotally attached to said sidewall.

* * * * *